United States Patent
Merlo

(10) Patent No.: US 9,212,888 B2
(45) Date of Patent: Dec. 15, 2015

(54) METHOD FOR COMPENSATING MEASUREMENT ERRORS CAUSED BY DEFORMATIONS OF A MEASURING MACHINE BED UNDER THE LOAD OF A WORKPIECE AND MEASURING MACHINE OPERATING ACCORDING TO SAID METHOD

(75) Inventor: Lorenzo Merlo, Turin (IT)

(73) Assignee: Hexagon Metrology S.P.A., Moncalieri (IT)

( * ) Notice: Subject to any disclaimer, the term of this patent is extended or adjusted under 35 U.S.C. 154(b) by 840 days.

(21) Appl. No.: 12/670,364

(22) PCT Filed: Jul. 24, 2007

(86) PCT No.: PCT/IT2007/000521
§ 371 (c)(1),
(2), (4) Date: Jul. 27, 2010

(87) PCT Pub. No.: WO2009/013769
PCT Pub. Date: Jan. 29, 2009

(65) Prior Publication Data
US 2010/0286941 A1 Nov. 11, 2010

(51) Int. Cl.
*G01P 21/00* (2006.01)
*G01B 5/008* (2006.01)
*G01B 5/00* (2006.01)
*G01B 21/04* (2006.01)

(52) U.S. Cl.
CPC .............. *G01B 5/008* (2013.01); *G01B 5/0016* (2013.01); *G01B 21/045* (2013.01); *G01B 21/04* (2013.01); *G01B 21/042* (2013.01)

(58) Field of Classification Search
CPC ...... G01B 5/008; G01B 5/0016; G01B 21/04; G01B 21/042; G01B 21/045
USPC ..................... 702/94, 95, 104, 105
See application file for complete search history.

(56) References Cited

U.S. PATENT DOCUMENTS

| | | | | |
|---|---|---|---|---|
| 4,939,678 | A * | 7/1990 | Beckwith, Jr. | 702/95 |
| 7,142,999 | B2 * | 11/2006 | Grupp et al. | 702/95 |
| 7,171,320 | B2 * | 1/2007 | Ogura et al. | 702/95 |
| 7,286,949 | B2 * | 10/2007 | McFarland et al. | 702/95 |
| 7,568,373 | B2 * | 8/2009 | McMurtry et al. | 73/1.81 |
| 2002/0029119 | A1 * | 3/2002 | Lotze et al. | 702/95 |
| 2005/0166412 | A1 * | 8/2005 | Ogura et al. | 33/502 |

FOREIGN PATENT DOCUMENTS

| | | |
|---|---|---|
| DE | 10006876 C1 | 6/2001 |
| DE | 10214489 A1 | 10/2003 |
| EP | 1559990 A | 8/2005 |

OTHER PUBLICATIONS

PCT International Search Report for application PCT/IT2007/00521, mailed on Jun. 20, 2008.

* cited by examiner

*Primary Examiner* — Paul D Lee
(74) *Attorney, Agent, or Firm* — FSP LLC

(57) ABSTRACT

A method of compensating the measurement errors of a measuring machine (1) deriving from the deformations of a machine bed (2) of the machine (1) caused by a load exerted by a workpiece to be measured on the machine bed (2), characterized by a first acquisition step (15) in which data regarding the weight of the workpiece and the conditions of constraint of the workpiece on the machine bed are acquired by a measurement and control unit (12) of the measuring machine (1) and a second calculation step (16, 17, 18, 19) in which correction values depending upon said data are calculated by said measurement and control unit (12), wherein the first step (15) includes selecting a standard load condition representing the load of the workpiece from among a plurality of standard load conditions; and the second step includes the step of calculating values correlated to the deformation of the machine bed (2) under the load of the workpiece represented by the selected standard load condition as a linear combination of corresponding values resulting from predetermined basic load conditions.

10 Claims, 4 Drawing Sheets

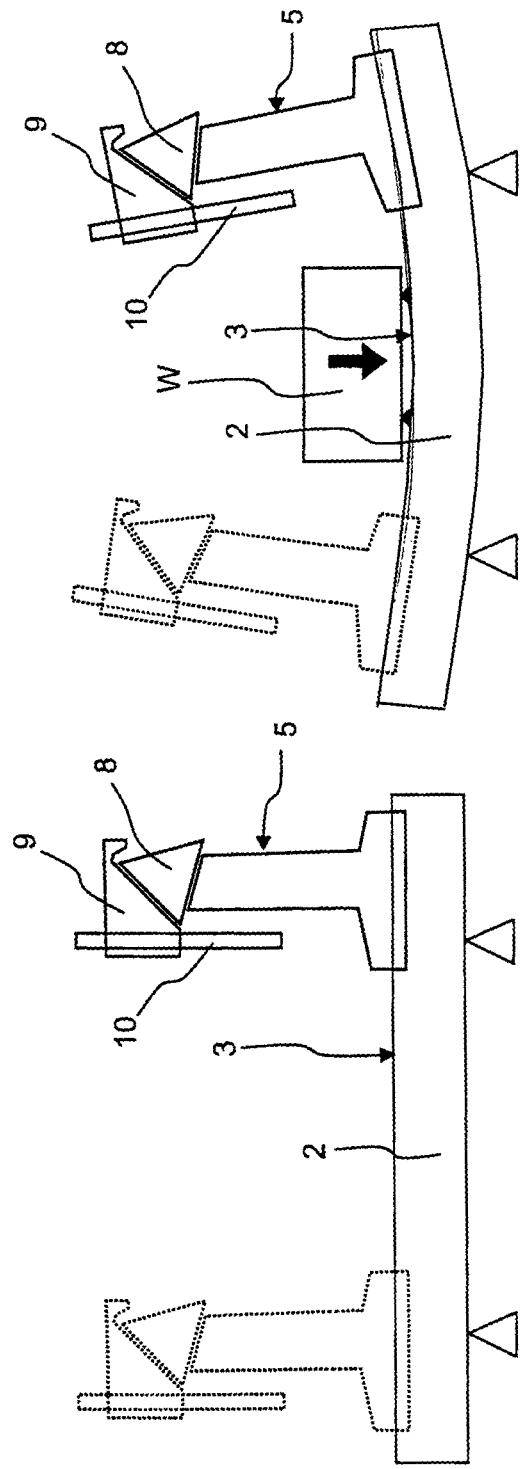

METHOD FOR COMPENSATING MEASUREMENT ERRORS CAUSED BY DEFORMATIONS OF A MEASURING MACHINE BED UNDER THE LOAD OF A WORKPIECE AND MEASURING MACHINE OPERATING ACCORDING TO SAID METHOD

PRIORITY CLAIM

This application claims priority under 35 U.S.C. 365 AND/OR 35 U.S.C. 119 to PCT application no. PCT/IT2007/000521 filed on Jul. 24, 2007.

TECHNICAL FIELD

The present invention relates to a method of compensating the measurement errors of a measuring machine deriving from the deformations of the machine bed caused by the load exerted by the workpiece to be measured on the machine bed, as well as to a measuring machine operating according to said method.

BACKGROUND ART

As is known, measuring machines are generally provided with a fixed base or machine bed and a mobile unit designed to move a measuring head according to co-ordinate axes with respect to the machine bed in a measurement space located above the machine bed. The mobile unit generally comprises a main carriage, which is mobile along an axis that is longitudinal with respect to the machine bed, and one or more carriages carried by the main carriage, which are mobile along respective co-ordinate axes.

The machine bed can be monolithic, for example made of granite or cast iron, or else can comprise a set of components rigidly fixed to one another to form a substantially rigid structure. The machine bed generally has two functions: supporting and constraining the workpiece being measured, and defining a guide for the mobile unit, and in particular for the main carriage of the machine, along one of the co-ordinate axes of the machine.

Measuring machines of the aforesaid type are generally provided with a system for compensation of geometrical errors, i.e., of the measurement errors depending upon the constructional defects of the machine (for example, rectilinearity errors of the axes, defects of orthogonality between the axes, etc.).

Current compensation techniques, of a strictly geometrical nature, do not generally take into account the measurement errors deriving from the elastic deformations of the machine bed under the weight of the workpiece to be measured. When the workpiece to be measured has a considerable weight (for example, in the case of dies, engine parts, castings of large dimensions) said errors may be non-negligible and jeopardize the accuracy of the machine.

DISCLOSURE OF INVENTION

The aim of the present invention is to propose a compensation method that will be free from the drawbacks proper to the known methods and that will in particular enable the measurement errors induced by the deformations of the machine bed due to the weight of the workpiece to be taken into account.

The aforesaid purpose is achieved by a compensation method according to Claim 1.

The present invention likewise regards a measuring machine operating according to said method.

BRIEF DESCRIPTION OF THE DRAWINGS

For a better understanding of the present invention, described in what follows is a preferred embodiment, provided by way of non-limiting example with reference to the annexed drawings, wherein:

FIG. 2 is a schematic side view of the machine of FIG. 1, in the absence of load;

FIG. 3 is a schematic side view of the machine of FIG. 2, with a schematic representation of the geometrical variations induced by placing the workpiece on the machine bed;

BEST MODE FOR CARRYING OUT THE INVENTION

Figure 1:
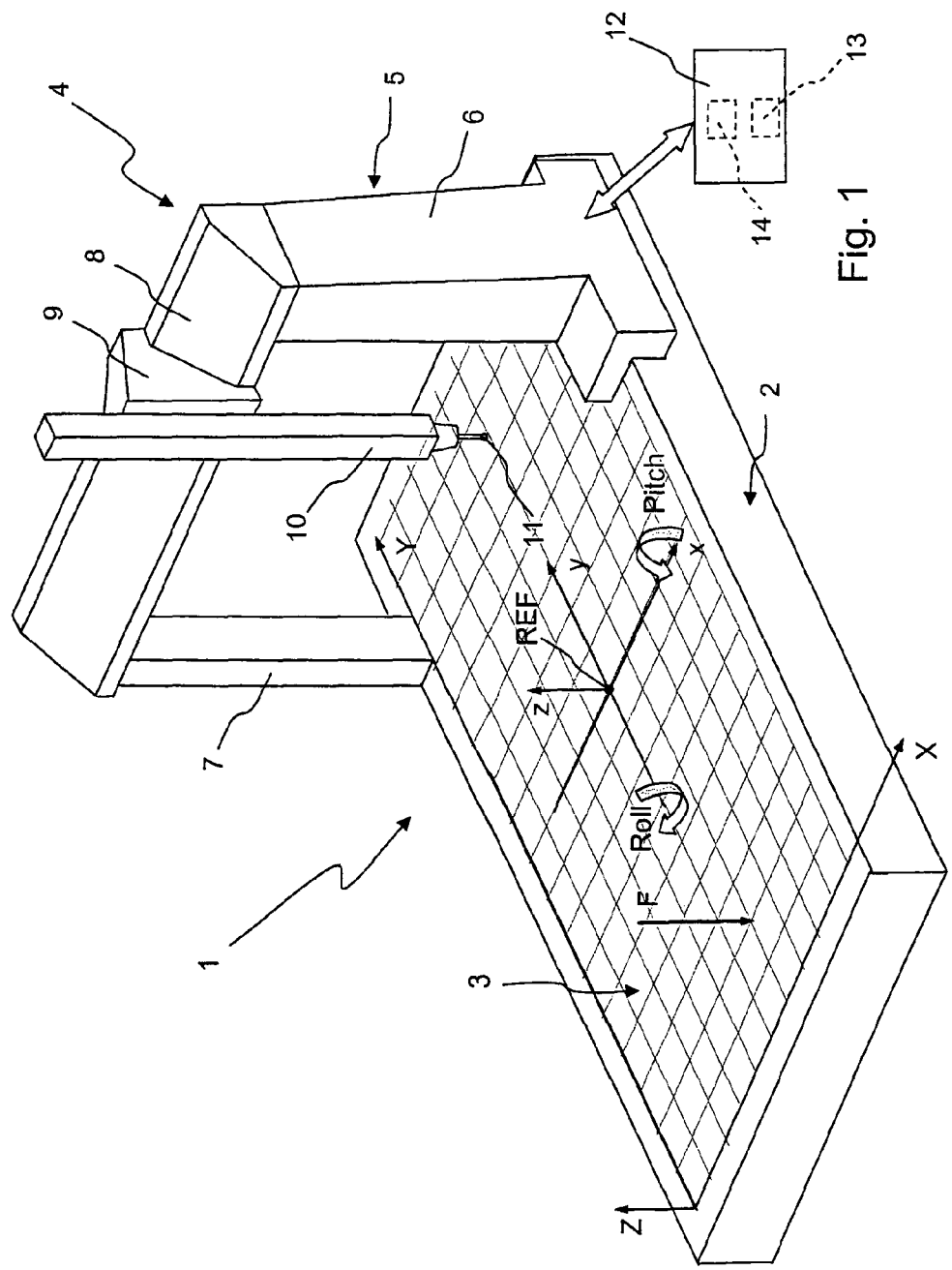
FIG. 1 is a schematic perspective view of a measuring machine operating according to the method of the present invention.

With reference to FIG. 1, designated as a whole by 1 is a portal measuring machine. It is at once pointed out that the method forming the subject of the present invention can be used for the compensation of the errors of machines of different architecture, for example with horizontal arm or pillars.

The machine 1 comprises a plane machine bed 2 provided with a horizontal working surface 3 designed to support an object to be measured (not illustrated), and a unit 4, which is mobile with respect to the machine bed 2 along co-ordinate axes.

The unit 4 comprises a main portal carriage 5 (in what follows, for reasons of brevity, "portal 5") , which is mobile with respect to the machine bed 2 along a horizontal axis Y. The portal 5 is provided with a pair of uprights 6 and 7 and a cross-member 8 extending between the uprights 6 and 7 in a direction parallel to a horizontal axis X and perpendicular to the axis Y.

The unit 4 moreover comprises a secondary carriage 9, carried by the cross-member 8 and mobile on the cross-member along the axis X, and a measurement column 10, carried by the carriage 9 and mobile with respect thereto along a vertical axis Z orthogonal to the axes X and Y.

Mounted on a bottom end of the column 10, possibly via a two-axes articulation device (not illustrated) is a touch probe 11.

The portal 5, the carriage 9, and the column 10 are mobile under the control of respective electric motors (not illustrated), which are in turn controlled by a measurement and control unit 12. The latter is connected to position transducers (not illustrated) associated to the machine axes and to the probe 11 so as to receive from the latter signals for enabling acquisition of the instantaneous co-ordinates of the machine axes.

The machine 1 is equipped with a system for compensation of geometrical errors that is in itself known. Compensation is carried out on the basis of a stored map 13 determined in loadless conditions via a kinematic model of the machine of a conventional type.

With reference to FIG. 1, identified on the working surface 3 is a fixed reference setting position REF used for geometrical compensation of the machine. Defined moreover is a cartesian reference system xyz with axes parallel to the axes X, Y, Z of the machine and origin in the point REF.

The compensation map is obtained in a known way, and hence not described in detail, by means detecting the error parameters in points appropriately set at a distance from one another along the axes x, y, z. For each of the aforesaid points, differential measurements of position are carried out with respect to the point REF, for example via an interferometer, and differential measurements of inclination, for example using a fixed inclinometer located in the point REF and an inclinometer mounted on the mobile unit 4.

According to the present invention, an additional compensation method is proposed that will moreover enable determination of the effects of the deformation of the machine bed 2 due to placing of the workpiece to be measured on the machine bed. For metrological purposes, said effects basically result in an alteration of the geometry of the axis Y, i.e., in variations of configuration of the portal 5 as a function of its position along the path of travel. Said variations are highlighted schematically from a comparison of FIG. 3, where the machine bed 2 is loaded by a weight W, with FIG. 2, where the machine bed is not loaded.

The alterations of the geometry of the axis Y are similar to the ones due to the geometrical errors of the machine, which are included in the map 13 of geometrical compensation of the machine 1, determined in the absence of load. The variations of attitude due to the weight, calculated for example using a finite-element numeric simulation model, can thus be entered as additional corrections in the existing compensation map.

In this way, compensation of the phenomenon of deformation under examination can be obtained.

The numeric simulation can be implemented in the machine, for example, in one of the following ways:

integration of a finite-element model and of the corresponding calculation program in the measurement and control unit 12 of the machine 1; at each placing of the workpiece, the calculating routine is set up and run; and storage in the measurement and control unit 12 of the machine 1 of a map containing data of deformation of the machine bed calculated previously once and for all for a pre-defined set of load cases.

Described in what follows is an example of embodiment of the second mode of implementation described above.

On this hypothesis, it is assumed that the main attitude variations of the portal 5, caused by the deformation of the machine bed 2, are the rotations about the horizontal axes (x and y), whilst the other components are neglected. The compensation method is, however, to be considered altogether general and applicable to any component of the deformation.

The rotations about the axes x and y, referred to as pitch and roll, correspond to the ones considered by the geometrical compensation commonly used, as described above, and are understood with respect to the reference system x, y, z, fixed with respect to the point REF.

For a series of conditions of basic load on the machine bed 2, using finite-element calculation, it is possible to create a map containing the values of the rotations of pitch and roll of the portal 5 as a function of its position along the path of travel.

For example, as basic load condition there may be assumed the application of a unit vertical force F (e.g., 1 kN) on a point of a grid aligned to the axes X, Y, of pre-set pitch (e.g. 100 mm), lying on the working surface 3 (FIG. 1). For each basic load condition, i.e., for each point of application of the unit force belonging to the grid, there are previously calculated, using the finite-element method, the values of rotation of pitch and roll of the portal 5 as the position of the portal varies along its own path of travel (i.e., as Y varies).

Figure 4:
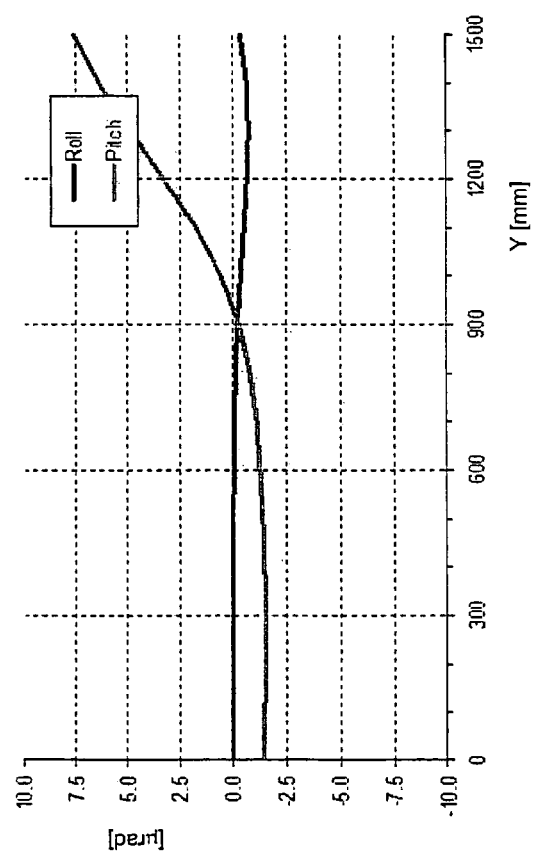
FIG. 4 is a graph illustrating the evolution of the rotations of pitch and roll of a main carriage of the machine according to the path of travel, in the presence of a load on the machine bed.

The graph of FIG. 4 illustrates the evolution of the rotations of pitch and roll of the portal 5 as Y varies, for a given basic load condition.

Calculating the rotations of pitch and roll as the position of the carriage varies for all the pre-defined basic load conditions, it is possible to create a pre-defined deformation map 14 that is stored in the measurement and control unit 12 of the machine 1 as being characteristic of that given model of machine.

A real condition of load, corresponding to the placing on the machine bed of a given workpiece to be measured, will be defined by the set of the characteristics that concur to determine the load transmitted to the machine bed in the case in point, namely:

total weight of the workpiece and of the possible supporting and fixing equipment;

position of the centroid of the total load; and mode of resting on the working surface (number and position of the points or of the areas of resting).

The different positions of the resting points, of the centroid, etc. are understood as co-ordinates with respect to the reference system XY.

According to a preferred embodiment of the invention, the method envisages a series of rules and assumptions that will enable any condition of actual load to be brought back to an equivalent condition that can be represented using the basic loads.

The standard load conditions taken into account can be, for example, the following:

a) resting on any three points with any position of the centroid;

b) resting on four points at the vertices of a rectangle oriented parallel to XY with any position of the centroid;

c) resting on n points with a known load on each of them;

d) resting distributed over a rectangular area oriented parallel to XY and approximated by an integer number of meshes of the grid, with any position of the centroid; and e) resting distributed uniformly over an area approximated by an integer number of meshes of the grid.

Once the standard load conditions have been defined, it is necessary to define the rules of interpolation for transforming the configurations of standard load into linear combinations of cases of basic load.

Figure 5:
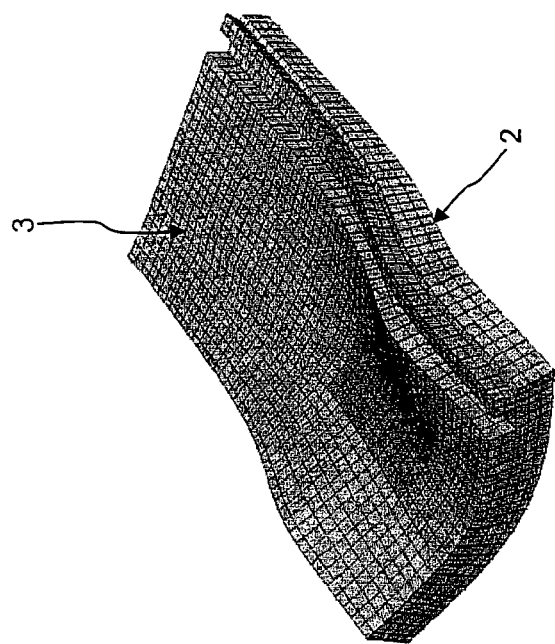
FIG. 5 is a schematic perspective view of the machine bed illustrating the deformations induced by the weight of the workpiece.

Said rules may, for example, be the following:

in the case of a load concentrated on one resting point, the load is decomposed into four forces applied on the vertices of the mesh of the grid containing the resting point, and calculated, for example, by imposing for each mesh equilibrium to rotation and absence of torsion with respect to two axes passing through the point of application of the load and parallel to the sides of the mesh;

in the case of distributed resting (FIG. 5), the total load weighing on each mesh of the grid is calculated, and said load is decomposed into four equal loads applied on the vertices of the mesh.

Given any linear combination of cases of basic load, it is possible to calculate the corresponding values of rotation of pitch and roll of the main carriage operating as follows:

extraction from the deformation map of the pitch and roll rotation values regarding each component of the linear combination (case of basic load, with unit force);

proportioning on the basis of the effective value of the load; and sum of all the components to obtain the total effect.

The rotations thus calculated are used as correction (setting the sign appropriately) for updating the geometrical compensation map of the machine and then correcting the measurements carried out on the workpiece.

Figure 6:
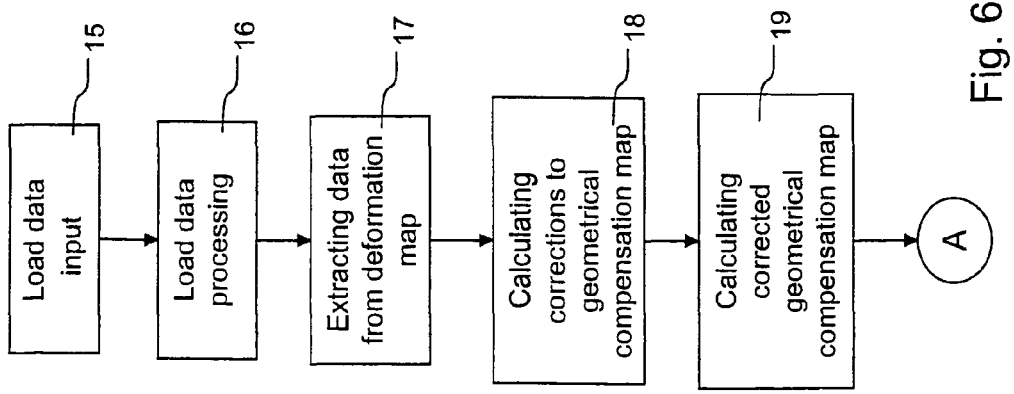
FIG. 6 is a block diagram of the method of the present invention.

The method is implemented as processing program according to the block diagram of FIG. 6.

A first input block 15 enables acquisition of the data regarding the load configuration.

Said acquisition can be carried out by manual input. In particular, the operator enters (by typing in from a keyboard or via graphic interface) the data regarding the load condition in the specific case:

the total weight loaded on the machine bed: manual input or else confirmation of a weight calculated automatically on the basis of the CAD solid model (if available);

the load configuration, chosen between the standard ones available;

according to the previous choice, the data necessary for the calculation:

co-ordinates of the resting points;

limits X and Y of the resting area (if rectangular);

co-ordinates of the centroid of the load;

meshes of the grid subjected to distributed load;

load per resting point (in the case of n resting points).

Alternatively, the step described above for acquisition of the data can be automatic: during the step of alignment prior to measurement, the points acquired by the measuring machine can be used for determining the position of the workpiece on the working surface for the configurations b), d), e).

Control then passes to a subsequent processing block 16, in which the load data are processed on the basis of the rules described above for determining the basic load conditions necessary for representation of the standard load entered, as well as the coefficients of the linear combination of the basic loads equivalent to the standard load entered.

In a subsequent block 17, the program extracts from the pre-defined deformation map 14, for each basic load condition, the errors of rotations of pitch and roll as the position of the portal 5 varies.

In block 18, the values of correction to be made to the geometrical compensation map are calculated as linear combination of the errors of rotation determined in block 17, on the basis of the coefficients determined in block 16.

Finally, in block 19 the correction values are used for correcting the geometrical compensation map and thus calculating a corrected geometrical compensation map, which depends not only upon the model of the machine but also upon the specific condition of load, i.e., upon the workpiece measured and the conditions of constraint of the workpiece.

The set of the data entered and calculated during the step of compensation can be stored for a subsequent re-use in the case of measurement of a similar workpiece.

The machine 1 is now ready for execution of a measurement cycle.

Figure 7:
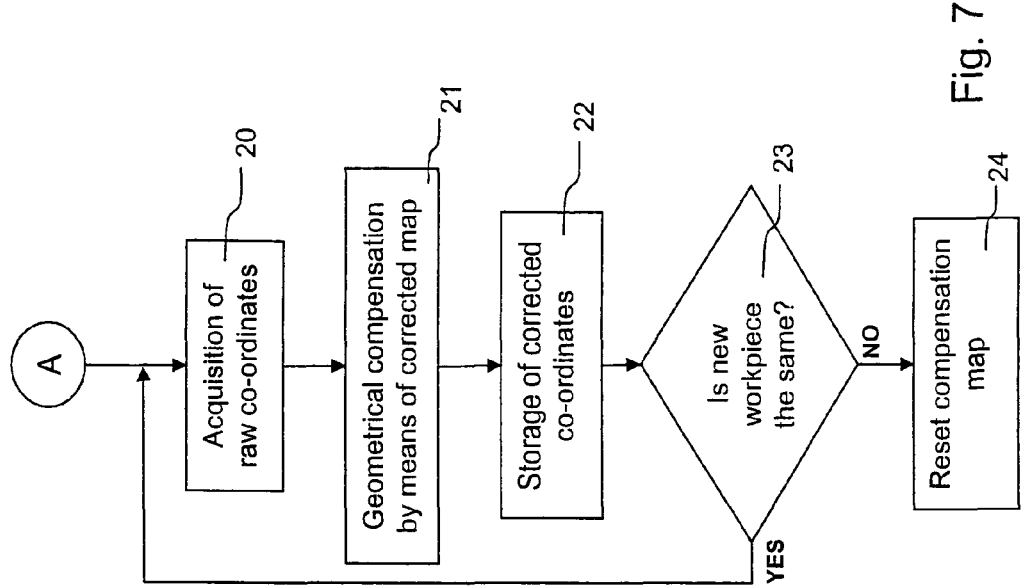
FIG. 7 is a block diagram of a measurement method, which uses a corrected compensation map obtained using the method of the invention.

The block diagram of FIG. 7 illustrates a procedure of measurement of a workpiece.

From a measurement block 20, in which the machine 1 acquires the "raw" co-ordinates, i.e., the ones not yet compensated and hence subject to errors of a geometrical nature, control passes to a block 21, in which the raw co-ordinates are compensated in a way similar to what occurs in conventional machines but, according to the present invention, via the corrected geometrical compensation map.

Consequently, the measurements will be purged of the negative effects of the phenomenon under examination.

The "corrected" co-ordinates thus calculated are stored in block 22.

At the end of the measurement, the operator can conveniently choose (block 23) whether to maintain the corrected map active, for measuring another workpiece of the same type, or else return to the previous situation (block 24 for reset of the compensation map).

Since the positions of the workpiece on the working surface and the possible modes of resting are theoretically infinite, the method can comprise, as integration of what has been described, the indication of guidelines for placing the workpiece, so as to render the actual working conditions as close as possible to the ones considered in the theoretical model, upon which the compensation is based.

From an examination of the characteristics of the compensation method described, the advantages that it affords are evident.

In particular, in addition to the usual geometrical compensation, also the geometrical errors induced by the deformation of the machine bed as a result of the load of the workpiece are compensated. This makes it possible to take into account, in the compensation, both the weight of the workpiece and the conditions of constraint thereof on the machine bed.

Finally, it is clear that modifications and variations can be made to the method described herein, without thereby departing from the sphere of protection specified in the annexed claims.

In particular, even though the method has been described with reference to a portal machine, it is altogether general and can be applied to machines of any type, even non-cartesian ones.

Furthermore, even though the method has been described with reference to the compensation of the errors of rotation of the portal, it can be extended to the correction of any geometrical error induced by the load of the workpiece.

The invention claimed is:

1. A method of compensating for measurement errors of a measuring machine deriving from deformations of a machine bed of the measuring machine caused by a load exerted by a workpiece to be measured on the machine bed, the method comprising:

a profiling step forming a defined set of standard load conditions, each load condition of the defined set of standard load conditions corresponding to a predetermined mode of resting of the workpiece on the machine bed, the profiling step further comprising applying a predetermined load on predetermined points of the machine bed to form predetermined basic load conditions;

an acquisition step in which data regarding a measured weight of the workpiece and a measured mode of resting of the workpiece on the machine bed representing a number and positions of points or areas of resting of the workpiece on the machine bed are acquired by a measurement and control unit of the measuring machine;

said acquisition step further comprising selecting a selected standard load condition from the defined set of standard load conditions, the selected standard load condition representing a load of the workpiece on the machine bed corresponding to the measured weight of the workpiece and the measured mode of resting of the workpiece;

a calculation step in which calculated correction values depending upon said measured weight of the workpiece and the measured mode of resting of the workpiece are calculated by said measurement and control unit; and said calculation step comprises calculating values correlated to the deformations of the machine bed under the load of the workpiece represented by the selected standard load condition as a linear combination of corresponding values of the predetermined basic load conditions.

2. The method according to claim 1, said calculation step further comprising calculating correction data for correcting a previously stored geometrical compensation map.

3. The method according to claim 1, wherein said predetermined points of the machine bed define a grid on a working surface of said machine bed.

4. The method according to claim 3, wherein said defined set of standard load conditions comprise at least a condition of resting of the predetermined load distributed over a rectangular area oriented parallel to two co-ordinate axes (X, Y) of the working surface and approximated with an integer number of meshes of the grid.

5. The method according to claim 3, wherein said defined set of standard load conditions comprise at least one condition of resting of the predetermined load distributed uniformly over an area approximated with an integer number of meshes of said grid.

6. The method according to claim 1, wherein said defined set of standard load conditions comprise at least a condition of resting of the predetermined load on three points.

7. The method according to claim 1, wherein said defined set of standard load conditions comprise at least a condition of resting of the predetermined load on four points at vertices of a rectangle oriented parallel to two co-ordinate axes (X, Y) of a working surface of said machine bed.

8. The method according to claim 1, wherein said defined set of standard load conditions comprises at least a condition of resting of the predetermined load on n points with a known load on each of the n points.

9. The method according to claim 1, wherein said calculated correction values are calculated on a basis of a simplified model of the machine that utilizes a reduced number of error components.

10. The method according to claim 1, said measuring machine is a Cartesian measuring machine comprising a main carriage mobile with respect to a working surface of the machine bed along a first axis (Y), and further comprising at least one second carriage carried by said main carriage and mobile with respect to this the main carriage along a second axis (X) orthogonal to the first axis (Y) and parallel to said working surface, wherein said calculated correction values are calculated on the basis of a simplified model of the machine that takes into account only rotations of said main carriage about said first axis and said second axis (X, Y).

* * * * *